US 6,669,126 B1

(12) United States Patent
Albert et al.

(10) Patent No.: US 6,669,126 B1
(45) Date of Patent: Dec. 30, 2003

(54) PAYOUT DEVICE FOR DATA TRANSMISSION LINES AND METHOD FOR THE PRODUCTION OF PAYOUT DEVICE

(75) Inventors: Elmar Albert, Neidlingen (DE); Kuno Roder, Eglharting (DE); Helmut Braun, Kirchheim-Teck (DE)

(73) Assignee: LFK-Lenkflugkorpersysteme GmbH, Munich (DE)

( * ) Notice: Subject to any disclaimer, the term of this patent is extended or adjusted under 35 U.S.C. 154(b) by 0 days.

(21) Appl. No.: 09/868,382

(22) PCT Filed: Nov. 24, 1999

(86) PCT No.: PCT/DE99/03740
§ 371 (c)(1),
(2), (4) Date: Nov. 20, 2001

(87) PCT Pub. No.: WO00/37347
PCT Pub. Date: Jun. 29, 2000

(51) Int. Cl.$^7$ .................. B65H 18/28; B65H 81/00; F42B 15/04
(52) U.S. Cl. .................. 242/173; 242/920; 156/169; 244/3.12
(58) Field of Search ................... 242/172, 173, 242/178, 920; 244/3.12; 156/169

(56) References Cited

U.S. PATENT DOCUMENTS

| 3,910,521 | A | * | 10/1975 | O'Callaghan et al. ... 242/413.9 |
| 4,752,043 | A | | 6/1988 | Heinzer |
| 5,029,960 | A | * | 7/1991 | Hulderman et al. ..... 242/118.2 |
| 5,064,490 | A | * | 11/1991 | Chapin et al. ............... 242/173 |
| 5,154,366 | A | | 10/1992 | LeCompte |
| 5,167,382 | A | * | 12/1992 | Rochester et al. ......... 244/3.12 |
| 5,186,781 | A | | 2/1993 | Verville |
| 5,209,416 | A | * | 5/1993 | LeCompte ................... 242/159 |
| 5,556,045 | A | * | 9/1996 | Johnson et al. ............. 242/920 |
| 5,678,785 | A | * | 10/1997 | Porter ........................ 244/3.12 |

FOREIGN PATENT DOCUMENTS

| EP | 0436505 | 7/1991 |
| EP | 0619260 | 10/1994 |
| FR | 2644764 | 9/1990 |
| WO | 9005929 | 5/1990 |
| WO | 9010244 | 9/1990 |
| WO | 8806564 | 9/1998 |

* cited by examiner

Primary Examiner—Michael R. Mansen
(74) Attorney, Agent, or Firm—Ladas & Parry

(57) ABSTRACT

A storage device for data transmission lines, which serve for data transmission between a moving object and a base station, has a spool unit (2) on which a data transmission line (1) is wound in the form of a package of several layers (21) of windings. The windings in each layer are introduced at a maximum tensile stress or force, which is dependent on the modulus of elasticity of the data transmission line (1). In this way, a creep or flow of the material of data transmission line (1), which is due to the pressure that is produced on the individual layers (21), is reduced or avoided, and a stable ordering of the windings is assured over a long period of time. The pressure of a winding on the layer (21) lying thereunder is less than 0.6 N/mm$^2$, at least in the lower region of the windings. The maximum tensile stress is calculated from the diameters of data transmission line (1) and spool unit (2), the modulus of elasticity of data transmission line (1) and the total number N of layers (21) of the package.

9 Claims, 5 Drawing Sheets

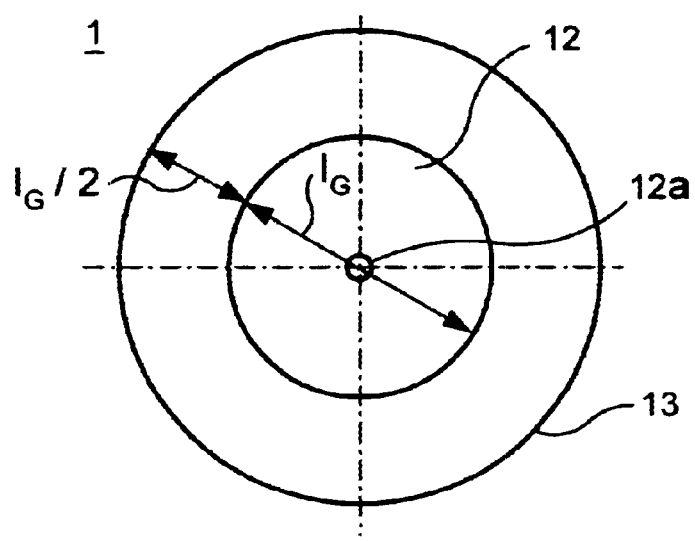
F I G. 1
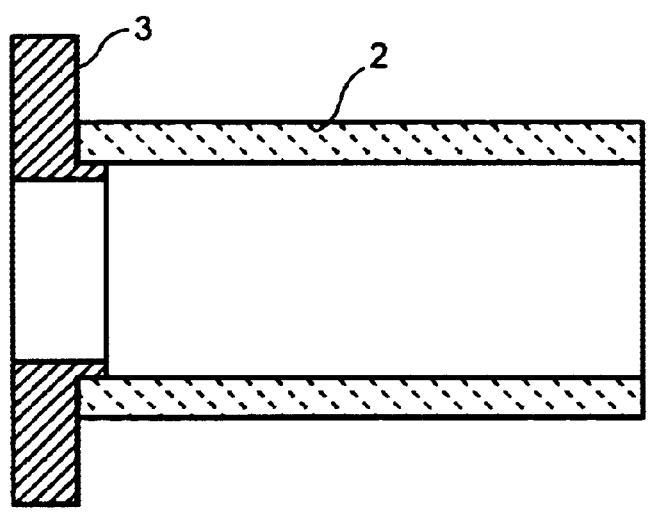
F I G. 2

PAYOUT DEVICE FOR DATA TRANSMISSION LINES AND METHOD FOR THE PRODUCTION OF PAYOUT DEVICE

FIELD OF THE INVENTION

The present invention concerns a payout device for data transmission lines according to the preamble of patent claim 1, as well as a method for the production of a payout device for data transmission lines.

BACKGROUND AND PRIOR ART

Payout devices for data transmission lines find application in movable objects that can be remotely controlled, such as, for example, rockets missiles, aircraft as well as in land vehicles, water vehicles and underwater devices, which will be steered over great distances from a base station with the help of a data transmission line. Thus the data transmission line is withdrawn at a high speed, which can sometimes even reach supersonic speed, from at least one coil or spool or a spool system.

For example, an aircraft can be steered and controlled, e.g., by electrical signals via a direct wire connection between the aircraft and an earth station Thus a rule, strain-relieved Cu twin conductor lines are used, whereby the disadvantage arises, however, that only low-frequency signals can be transmitted over a relatively short distance.

Optical signals of high bandwidth can be transmitted over great distances by the use of fiber-optic waveguides as data transmission lines. So-called monomodal optical waveguides have already come close to the theoretical minimum attenuation. Thus, the necessary data can be transmitted over more than 100 km by means of optical devices. The fiber-optic waveguide normally used as the data transmission line is comprised essentially of a glass substrate, which is surrounded by a coating or plastic protective layer. The coating may comprise one or more layers of different types of plastic, whereby normally very soft types of plastic, such as, e.g., polyacrylate, are used. The coating serves for protection of the glass substrate from physical and chemical influences and reduces microbending, i.e., the attenuation of the light that passes through the optical waveguide as a consequence of partial pressure on the optical waveguide.

SUMMARY OF THE INVENTION

The data transmission line is wound onto a spool unit as a coil package in a known device. Several layers of windings are introduced under tensile stress and glued together. The tensile stress or the winding tension is necessary in order to endow the coil package with a high stability, which is necessary in the case of rapid unwinding, e.g., by a rocket. On the other hand, there is the danger that several layers are pulled off simultaneously and form a loop, which leads to the breakdown of the data transmission line. Data transmission lines of plastic or with a plastic protective layer, which are wound on a spool as a coil package, however, have the disadvantage that the plastic or the coating shows a great tendency for creep or flow behavior under the indicated stress. In this way, a deviation from linear force-deformation behavior is produced. Under the pressure of the windings, macromolecules and molecular chains are rearranged, so that a viscous behavior of the material results. Moreover, the windings of the coil package loosen over the course of time and disruptions arise in the arrangement of the coil package. Individual windings become crooked and during the unwinding operation, there is the increased danger that the windings will be pulled off irregularly and form loops, which will lead to breaking.

It is thus proposed in FR 2,644,764 A1 that the number of [winding] layers on a spool will not be greater than 40. Thus a spool system is shown, which is comprised of several spools, each of which does not have more than 40 windings, The limitation to 40 layers will prevent excessive creep of the coating, so that no relative shifts of the windings with respect to one another will occur and the order of the winding is retained. The construction proposed therein, however, has the disadvantage that a multiple number of spools must be integrated into one system and connected together, which is very expensive, and which has as a consequence additional components and thus additional weight, and requires a precise adjustment in the interplay of the spools.

It is thus the object of the present invention to provide a payout device for data transmission lines, by means of which the stability of a coil package with very many layers of windings is retained even over a long period of time, with relatively little expenditure. In addition, a method is proposed, which can be conducted in a cost-favorable manner, and-will make possible the production of a stable and secure payout device for data transmission lines with long lengths.

The payout device for data transmission lines according to the invention, which serves for the transmission between a moving object and a station, has a spool unit, on which a data transmission line is wound in the form of a package of several layers of windings, whereby the windings in each layer are introduced with a maximum tensile stress or tensile force, which is dependent on the modulus of elasticity of the data transmission line that is used. In this way, it is achieved that the windings show no creep or flow, which adversely affects the stability of the winding, whereby the windings remain stable in their position over a long period of time. The defined tensile stress of the windings is thus just high enough that a slipping of the windings is prevented even in the case of the indicated external influences and no disruptive creep occurs. The spool according to the invention may be produced by machine in a cost-favorable manner and with a defined tensile stress, whereby the tensile stress can be easily adapted to the respective material of the optical waveguide used.

Preferably, the maximal tensile stress is calculated according to formula $F_{max} < a + b \cdot E$, whereby a and b depend on the diameter of the data transmission line and/or the diameter of the spool unit, and E is the modulus of elasticity of the data transmission line. The maximum tensile stress is calculated particularly from the diameters of the data transmission line and the spool unit, the modulus of elasticity of the data transmission line and the total number of layers in the package.

Advantageously, the pressure of a winding on the layers that lie underneath it is less than 0.6 N/mm², at least in the lower region of the package. The windings in the package may be introduced with a winding tension, which is increased linearly from one layer to the next.

Preferably, the maximum tensile stress is calculated according to the formula $$F_{max} < 0.3 \frac{N}{mm^2} \frac{d(d \cdot N + D_s)}{N} + \frac{E \cdot d_E^3}{3D_s}$$

wherein d is the diameter of the data transmission line in mm, $D_S$ is the diameter of the spool unit in mm, N is the total number of layers of the package, E is the modulus of elasticity of the data transmission line in N/mm² and $d_E$ is the diameter in mm of the material of the data transmission line, which is relevant for the modulus of elasticity.

The maximum tensile stress of the $n^{th}$ winding can be calculated according to the formula:

$$F_{max} \leq \frac{1 \text{ Newton}}{N} n + 0.3 \frac{\text{Newton}}{mm^2} \frac{d(D_s - N \cdot d)}{N}\left[1 - \frac{n}{N}\right] + \frac{E \cdot d_E^3}{3D_S}$$

wherein n is the respective layer number, N is the total number of layers of the package, d is the diameter of the data transmission line in mm, $D_S$ is the diameter of the spool unit in mm, E is the modulus of elasticity of the data transmission line in N/mm², $d_E$ is the diameter in mm of the material of the data transmission line, which is relevant for the modulus of elasticity.

Advantageously, the data transmission line is a monomodal optical waveguide with one or more plastic layers, which is preferably wound onto the spool unit at a tensile force of less than or equal to 0.4 N. The windings can be glued with an elastic adhesive.

In the method according to the invention for the production of a payout device for data transmission lines, a spool unit with a data transmission line is wound such that several layers of windings form a coil package on the spool unit, whereby the windings in each layer are introduced at a maximum tensile stress or tensile force, which is dependent on the modulus of elasticity of the data transmission line. In this way, a coil package that is stable over a long period of time can be produced in a simple way and with conventional components.

Advantageously, a payout device as is described above, is produced by the method according to the invention. Preferably, after winding onto the spool unit, a temperature treatment is conducted at a temperature higher than 35° C., whereby the duration of the temperature treatment advantageously amounts to 8 hours and more.

BRIEF DESCRIPTION OF THE DRAWINGS

The present invention is described below on the basis of the drawings.

Therein:

FIG. 1 shows a cross section of an optical waveguide as a data transmission line in schematic representation;

FIG. 2 shows a schematic representation of a cylindrical spool unit, which is provided for winding the data transmission line of FIG. 1;

FIG. 1 shows a cross section of an optical waveguide, as it is used in the present invention for the production of the coil package. On its inside, optical waveguide 1 has a glass substrate 12 which is surrounded by a coating or plastic protective layer 13. The glass substrate 12 is protected from physical and chemical influences by coating 13, which is polyacrylate in the present case. A light-guiding core 12a, which forms a so-called mode field, in which data transmission occurs, is found in the center of optical waveguide 1. Optical waveguide 1 has a glass diameter of approximately 125 µm and a total diameter of approximately 250 µm. The length ratio of coating to glass is appropriately referred to the cross-section of the optical waveguide:

$$I_c/I_G = 1/1 \qquad (1)$$

The light-guiding core 12a has a diameter of approximately 9 µm in the single-mode optical waveguide shown here.

DETAILED DESCRIPTION

FIG. 2 shows a relatively rigid ceramic spool unit 2, which is shaped cylindrically in the present case and is attached or screwed onto a flange 3. Instead of ceramic, however, other materials may also be used for spool unit 2, thus, e.g., metal or plastic. Several windings are laid next one another in the winding of spool unit 2. Thus a layer of windings is formed onto which the next layer is then wound. The windings are thus introduced with a maximal tensile stress or force, which is dependent on the modulus of elasticity of optical waveguide 1 or the data transmission line. By maintaining this limiting value for the winding tension, it is achieved that creep processes that could lead to the loosening of the windings do not occur in the coil package, even during a long storage, so that an unintentional stripping of the windings does not occur and the windings are no longer simultaneously pulled off during unwinding. The stability of the spool is increased. Both the windings as well as the layers are glued together.

Figure 3:
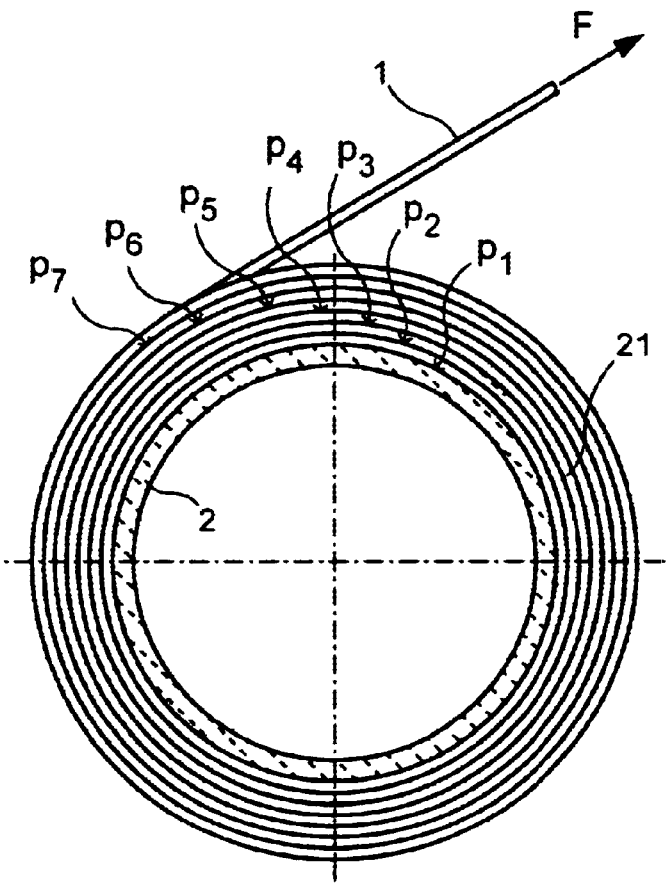
FIG. 3 shows a schematic representation of a cross section of a spool of the payout device according to the invention.

The structure of a spool with the winding tension according to the invention is shown schematically in FIG. 3. Several layers 21 of different windings lying next to one another are already found on spool unit 2. The layer n=1 lies directly on spool unit 2 and the total number of layers amounts to N. The winding tension is represented by the force vector F. This causes the windings n to rest securely on their substrate, i.e., the spool unit 2 or the layer lying thereunder. The more rigid the data transmission line is, the greater the winding tension must be, in order to make possible a perfect winding. A greater winding tension facilitates the winding process, but this is limited according to the present invention by the defined maximal winding tension as a function of the modulus of elasticity of the optical waveguide.

The theoretical total pressure, which one layer n exercises on the layer lying underneath it results from the sum of the individual pressures as:

$$P_{N,n} = \sum_n^N p_n = \sum_n^N \frac{F}{d \cdot r_n} \qquad (2)$$

wherein $P_{N,n}$ is the pressure which the windings of the $n^{th}$ layer and the layers lying over this exercise on the under-lying layers for a total number of N layers, and $p_n$ is the pressure which the winding of the $n^{th}$ layer with the radius $R_n$ produces radially toward the inside as a consequence of the winding tension F. As can be seen in FIG. 3, the winding tension F introduced in winding the spool leads to the structure of a radial pressure distribution $p_n$ over the spool cross-section.

Figure 4:
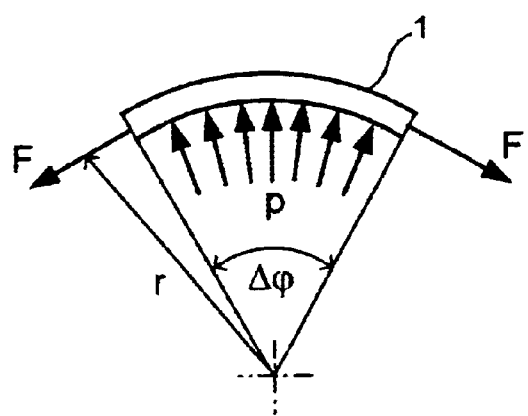
FIG. 4 shows a segment of a winding on the payout device according to the invention.

FIG. 4 shows a section of a winding of an arbitrary layer with the forces that are applied thereon. F is thus the force that produces the winding tension, r is the radius of the winding, and p is the pressure that develops. As a consequence of pressure p, the force $$\Delta F_W = p \cdot d \cdot r \Delta \phi \tag{3}$$

is transferred to the winding section, whereby d is the diameter of the data transmission line.

Figure 5:
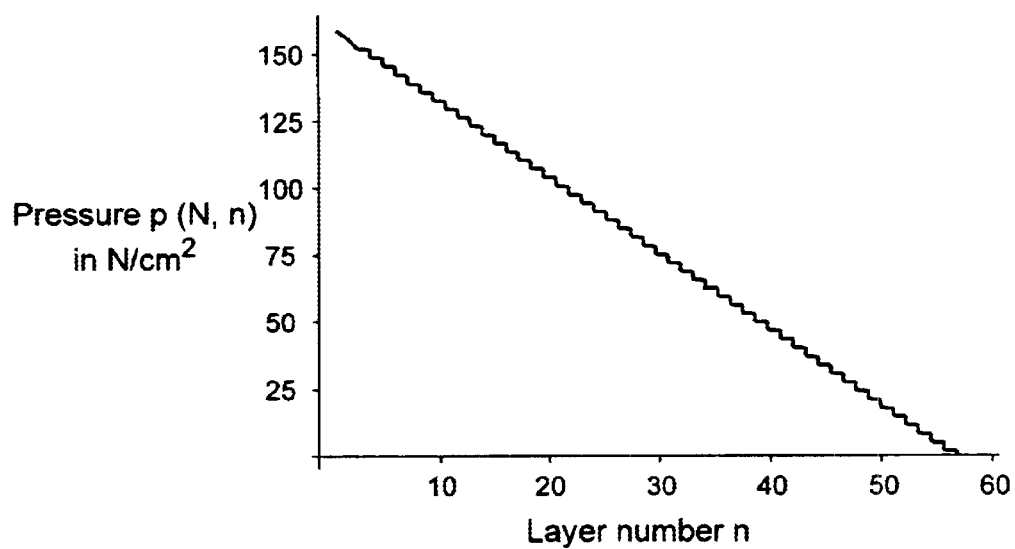
FIG. 5 shows the pressure as a function of the respective layer number n, for a total number of N layers.

FIG. 5 shows the theoretical pressure curve as a function of the layer without taking into consideration the flexural strength of the data transmission line. The pressure that the windings exercise on one another is proportional to the winding tension F. Since the latter is inversely proportional to the radius r, external windings contribute less to the pressure buildup than the inner layers. In the case of a total number of N layers of e.g., 60, the layers from n to N exercise the pressure p (N, n) on the layer n−1 lying thereunder. FIG. 5 plots this pressure p (N,n) in N/cm² with respect to the layer number n. The diameter $D_S$ of spool unit 2 in the present case amounts to 140 mm, and the winding tension F amounts to 0.8 N without taking into consideration the flexural strength. The tensile stress F in the data transmission line 1, which is shown in the above-described FIGS. 3 and 4 and which is developed by the winding tension, provides the coil package with the necessary stability in the case of mechanical or thermal load and for rapid unwinding of the spool. On the other hand, the tensile stress F and the resulting pressure $P_{N,n}$ cause a creep behavior of the coating material. However, this again varies with tensile stress F. In the payout device for data transmission lines shown here, the tensile stress F is limited to a precisely defined value. The compressive strains in the coil package is thus below a critical value, and essentially there is no creep of the coating. The coil package remains in a stationary state.

In the device according to the invention that is shown here, the pressure of a winding onto the layer lying thereunder in the lower region, i.e., in the region of n=1, is smaller than 0.6 N/mm². According to the above-shown Equation (2), taking into consideration the flexural strength of the data transmission line, the maximal tensile force or winding tension, with which the data transmission line will be wound, results from this:

$$F_{max} < 0.3 \frac{N}{mm^2} \frac{d(d \cdot N + D_s)}{N} + \frac{E \cdot d_E^3}{3D_s} \tag{4}$$

wherein d is the diameter of the data transmission line, $D_S$ is the diameter of spool unit 2, N is the total number of layers of the coil package, E is the modulus of elasticity of data transmission line 1, and $d_E$ is the diameter of the data transmission line, which is relevant for the modulus of elasticity E.

Figure 6A:
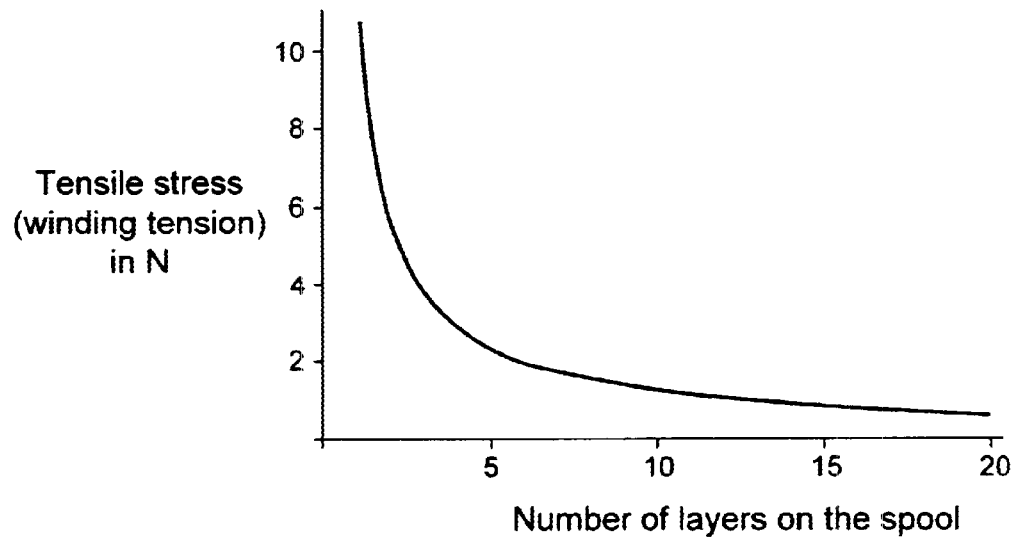
FIGS. 6a and 6b show the maximum permissible tensile stress according to the invention as a function of the number of layers on a spool unit for a conventional monomodal optical waveguide.
Figure 6B:
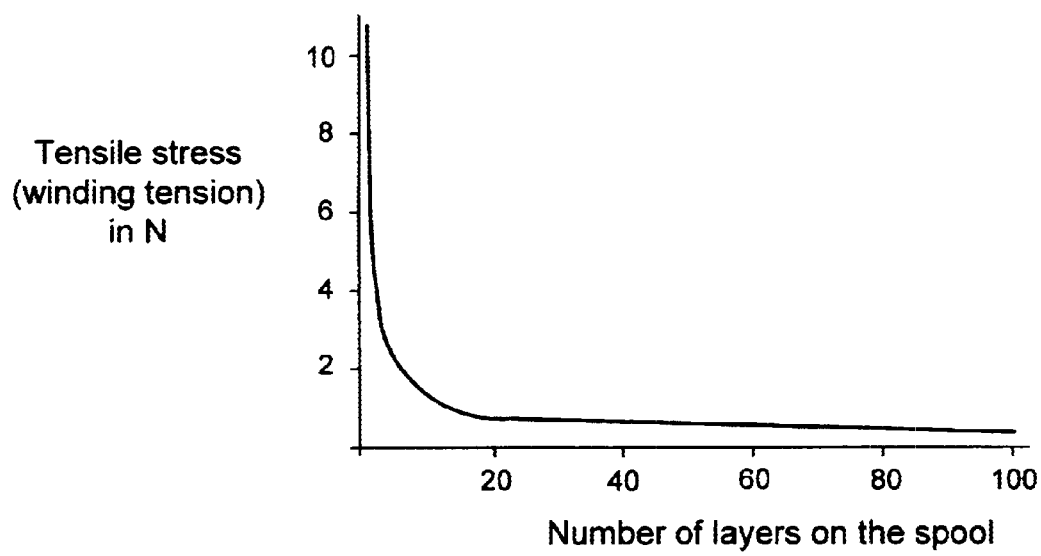

The number N of layers of which the entire coil package is comprised is plotted opposite-the maximum winding tension $F_{max}$ for a commercial monomodal optical waveguide with 0.125 mm glass diameter and 0.250 mm total diameter in FIGS. 6a and 6b.

The winding tension may now be slightly increased linearly per layer. The following relationship exists:

$$F_{max} \le \frac{1 \text{ Newton}}{N} n + 0.3 \frac{\text{Newton}}{mm^2} \frac{d(D_s - N \cdot d)}{N} \left[1 - \frac{n}{N}\right] + \frac{E \cdot d_E^3}{3D_s} \tag{5}$$

The tensile stress $F_{max:n}$, which is maximal or not to be exceeded, or the winding tension of optical waveguide 1 can be calculated with this equation for winding the windings of the $n^{th}$ layer. The further the stress goes below the magnitude $F_{max:n}$, the more stable the coil package is relative to creep.

Creep which leads to stresses in the coil package and that still occurs despite the measure of a tensile stress $F_{max:n}$ that is not to be exceeded, is equilibrated by the use of an elastic adhesive. In this way, adhesive connections are not broken down immediately and a slight creep of the coating can be allowed. If the compressive strain that is built up in the coil package as a consequence of tensile stress during winding falls below a critical magnitude due to the creep of the coating, the creep is stopped completely. The coil package remains in a stationary state. In order to achieve this state rapidly and under defined conditions, the spool is stored at elevated temperature after winding.

Figure 7:
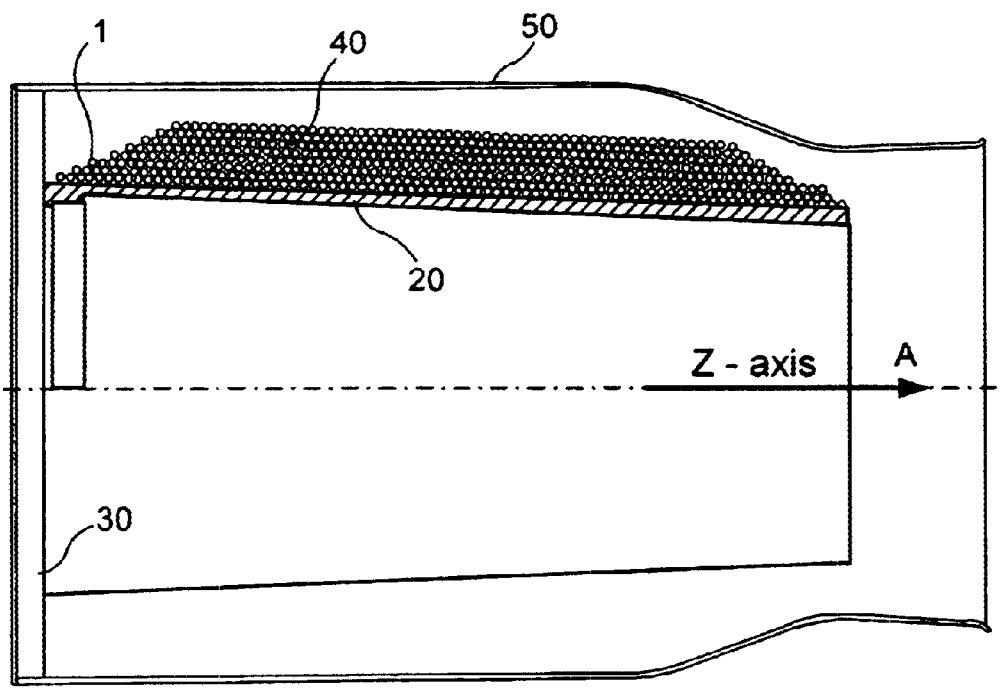
FIG. 7 shows a payout device according to the invention in longitudinal section as a schematic representation.

FIG. 7 shows the device according to the invention as a schematic representation. In this embodiment, the spool unit 20 is shaped conically or tapered and mounted onto a flange 30. The spool package 40 is comprised of a multiple number of windings of optical waveguide 1, which is wound onto spool unit 20. Optical waveguide 1 is glued on so that the windings have an increased stability. It is introduced at a defined tensile stress, which depends on its modulus of elasticity E, as described above. In this way, it is assured that a loosening of coil package 40 does not occur due to the creep or flow of the coating of optical waveguide 1. The spool system shown here is contained in a sheath 50. Sheath 50 is opened at its back end, so that optical waveguide 1 can be pulled out in the direction of the z-axis, as shown by arrow A. The maximum tensile stress according to the invention amounts to less than 0.6 N/mm² and is calculated for the lowermost layers according to the above-shown Equation 4, and for the other layers, according to Equation 5 also shown above.

Figure 8:
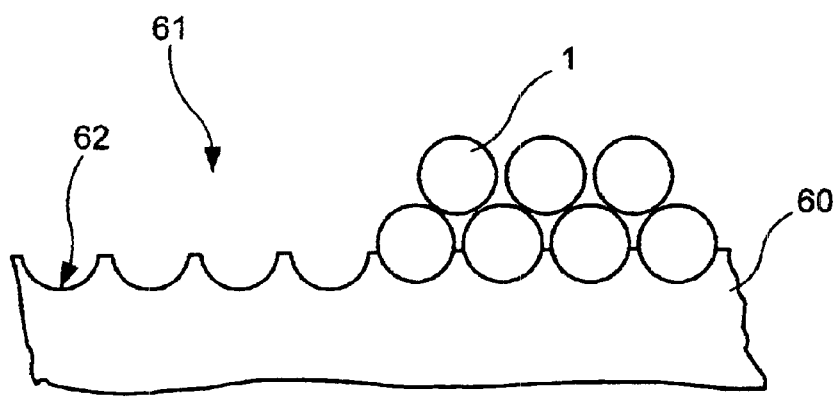
FIG. 8 shows a surface of a spool unit according to another form of embodiment of the invention.

FIG. 8 shows the surface of a spool unit 60 according to another advantageous embodiment of the present invention. The outer surface 61 of spool unit 60 is provided with grooves 62, which serve as a guide for optical waveguide 1. Instead of grooves 62 or depressions, a spiral or spiral-type groove or depression may also be provided, which extends along the conical or cylindrical surface of spool unit 60. When spool unit 60 is wound, the data transmission line or optical waveguide 1 is inserted into grooves 62 or into the spiral. In this way, the pressure force that operates on optical waveguide 1 due to the tensile stress during winding, is distributed onto a large application surface, so that a creep or flow of optical waveguide 1 is prevented or reduced. A deformation and a loosening of optical waveguide 1 that is associated therewith is avoided in this way and the windings attain an additional stability. In addition, the lowermost layer is also secured against slipping to one side along surface 61 of spool unit 60, even in the case of a small winding tension.

In general, the concept of the invention is that creep can be described as a function of time by the equations:

$$\Delta d = a \cdot t^b \tag{6b}$$

or $$\Delta d = a_1 \cdot b_1 \cdot ln(1+t) \tag{6b}$$

Herein, $\Delta d$ is the change in the diameter of the optical waveguide, and a, $a_1$, and $b_1$ are parameters, which are dependent on both the coating material, the load or pressure as a consequence of the winding tension and on temperature. The time considered is represented by t.

For short times t, Equation (6a) provides a good approximation of the experimentally determined creep curves of the coating of the optical waveguide. For longer times, the logarithmic representation according to Equation (6b) applies. Optical waveguides of different production [lots] have a different creep behavior.

By limiting the winding tension to a defined value, which is dependent on the material of the data transmission line to be wound, creep is extensively prevented and the stability is increased, so that the windings and layers remain fixed over long periods of time even in the case of mechanical influences such as vibration, shock and impact, as well as in the case of thermal loading. A reliable, rapid unwinding of the optical waveguide is assured in use. In the case of a dynamic, very rapid unwinding process, the coil package remains in its stable, ordered form and a simultaneous stripping of several windings or an unintentional pulling out of individual windings or coil packages is avoided. The necessary stability and the order of the windings is also retained during a long storage time and during transport. The invention can be realized in a cost-favorable manner by appropriate adjustment of the winding tension during production.

The payout device according to the invention can be utilized particularly for signal transmission between a moving object and a base station. The object may be operated remotely, e.g., for example, it may be a remotely steered aircraft. The payout device can be incorporated in the device or object due to its light weight and small structure or can be found in the region of the base or control station.

What is claimed is:

1. A storage device for payout of a data transmission line comprising a spool and a data transmission line wound in a plurality of layers on said spool from an inner region to an outer region to form a package of said layers, said data transmission line being wound in said layers at a defined tensile stress, said defined tensile stress at which said layers are wound being less than a maximum stress $F_{max}$ which is a function of the diameter of the transmission line, the diameter of said spool, the modulus of elasticity of said transmission line and the number of layers of said layers in said package in order to prevent creep between adjacent layers and provide stability of said layers, wherein each winding layer is wound at said defined tensile stress to exert a pressure on the winding layer thereunder of less than 0.6 N/mm² at least in the inner region of the package.

2. The storage device of claim 1, wherein the tensile stress in the winding layers increases linearly from one layer to the next outermost layer.

3. The storage device of claim 1, wherein wound layers of said line are adhered by an elastic adhesive.

4. The storage device of claim 1, wherein said spool has a surface with grooves for receiving said transmission line.

5. A storage device for payout of a data transmission line comprising a spool and a data transmission line wound in a plurality of layers on said spool from an inner region to an outer region to form a package of said layers, said data transmission line being wound in said layers at a defined tensile stress, said defined tensile stress at which said layers are wound being less than a maximum stress $F_{max}$ which is a function of the diameter of the transmission line, the diameter of said spool, the modulus of elasticity of said transmission line and the number of layers of said layers in said package in order to prevent creep between adjacent layers and provide stability of said layers, wherein the maximum tensile stress $F_{max}$ is defined by the expression $$F_{max} \leq \frac{1 \text{ Newton}}{N} n + 0.3 \frac{\text{Newton}}{\text{mm}^2} \frac{d(D_s - N \cdot d)}{N} \left[1 - \frac{n}{N}\right] + \frac{E \cdot d_E^3}{3 D_s}$$

wherein n is the respective layer number, NS is the total number of layers of the package, d is the diameter of the data transmission line in mm, $D_S$ is the diameter of the spool in mm, E is the modulus of elasticity of the data transmission line and $d_E$ is the diameter in mm of the material of data transmission line that determines for the modulus of elasticity.

6. A storage device for payout of a data transmission line comprising a spool and a data transmission line wound in a plurality of layers on said spool from an inner region to an outer region to form a package of said layers, said data transmission line being wound in said layers at a defined tensile stress, said defined tensile stress at which said layers are wound being less than a maximum stress $F_{max}$ which is a function of the diameter of the transmission line, the diameter of said spool, the modulus of elasticity of said transmission line and the number of layers of said layers in said package in order to prevent creep between adjacent layers and provide stability of said layers, wherein said data transmission line is a monomodal optical waveguide having one or more layers of plastic thereon, which is wound onto said spool with the defined tensile stress being less than or equal to 0.47 N.

7. A method for producing a storage device for a data transmission line, comprising winding a data transmission line on a spool from an inner region to an outer region in a plurality of layers to form a coil package, the line in each layer being wound with a defined tensile force said defined tensile force being less than a maximum tensile force $F_{max}$ based on the diameter of the data transmission line, the diameter of the spool, the modulus of elasticity of the data transmission line and the total number of layers of the coil package to prevent creep between adjacent layers and provide stability of said layers, wherein each winding layer is wound at said defined tensile stress to exert a pressure on the winding layer thereunder of less than 0.6 N/mm² at least in the inner region of the package.

8. The method of claim 7, further comprising heat treating said package after completing the winding of said layers on the spool.

9. The method of claim 8, wherein said heat treatment is carried out at a temperature of more than 35° C. For at least 8 hours.

* * * * *

UNITED STATES PATENT AND TRADEMARK OFFICE
CERTIFICATE OF CORRECTION

PATENT NO. : 6,669,126 B1  
DATED : December 30, 2003  
INVENTOR(S) : Elmar Albert et al.

It is certified that error appears in the above-identified patent and that said Letters Patent is hereby corrected as shown below:

<u>Title page, Item [54] and Column 1, line 3,</u>  
After "OF PAYOUT" delete "DEVICE"

<u>Title page,</u>  
Insert item -- [30]     Foreign Application Priority Data  
            Dec, 18, 1998   (DE)    q ….. 19858796.1 --.

Signed and Sealed this

Thirtieth Day of March, 2004

JON W. DUDAS  
*Acting Director of the United States Patent and Trademark Office*